United States Patent [19]

Fuwa

[11] Patent Number: 4,630,127
[45] Date of Patent: Dec. 16, 1986

[54] CHARACTER AND PICTURE INFORMATION READING APPARATUS

[75] Inventor: Jyoichi Fuwa, Atsugi, Japan

[73] Assignee: Ricoh Company, Ltd., Kyo, Japan

[21] Appl. No.: 710,301

[22] Filed: Mar. 8, 1985

[30] Foreign Application Priority Data

Mar. 19, 1984 [JP] Japan .................................. 59-52911

[51] Int. Cl.⁴ .............................................. H04N 1/04
[52] U.S. Cl. .................... 358/285; 358/293; 358/294; 355/14 SH
[58] Field of Search ............... 358/293, 294, 285, 256; 355/3 SH; 358/14 SH

[56] References Cited

U.S. PATENT DOCUMENTS

| | | | |
|---|---|---|---|
| 4,275,423 | 6/1981 | Takahashi et al. | 358/293 |
| 4,325,086 | 4/1982 | Sato et al. | 358/285 |
| 4,511,246 | 4/1985 | Nishiyama | 355/14 SH |
| 4,538,185 | 8/1985 | Wiggins | 358/285 |
| 4,585,332 | 4/1986 | Shenoy | 355/14 SH |

FOREIGN PATENT DOCUMENTS

57-04652  1/1982  Japan ................... 358/293

Primary Examiner—James J. Groody
Assistant Examiner—Edward L. Coles
Attorney, Agent, or Firm—Mason, Fenwick & Lawrence

[57] ABSTRACT

In an apparatus for reading an image of the document fixedly placed, the document's position, size, etc. is automatically decided. Linear light sources are arranged on a pressure plate in a position on the back side of the document in both the main scanning direction and the sub-scanning direction, and the presence or absence of lights from those light sources is monitored by a sensor arranged on the side facing the document to decide the presence or absence of the document. The sensor comprises a one-dimensional solid scan type image pickup device for reading images, and another sensor for receiving the light coming from the position locating ahead the scan position currently detected by the image pickup device.

8 Claims, 9 Drawing Figures

CHARACTER AND PICTURE INFORMATION READING APPARATUS

BACKGROUND OF THE INVENTION

The present invention relates to an image reading apparatus such as a facsimile or copying machine, etc. and more particularly to a character and picture information reading apparatus in which the document such as a book is fixedly placed on a document glass plate, and the document glass plate or an optical scan system is scanned to read image information.

With the size of document being optional in the image reading apparatus of this type, a substantial waste will be caused unless an image reading range is limited only to an area where the document is present. In a facsimile machine, for example, if an area of A4 size is read with respect to the document of B5 size, information wasteful in about ⅓ portion thereof would be transmitted and, therefore, a transmission time would be prolonged about 1.5 times longer than the normal case. In a machine where the reading size is selectable using a switch, such a waste in reading, etc. can be avoided by an operator to make proper switch operation. But erroneous operation may cause missing information, wasteful reading, etc. Moreover, if the document is not properly positioned even with the document size being properly specified, correspondence between the document surface and the reading surface would be shifted to cause missing information, etc.

To avoid such disadvantages, it is envisaged to automatically detect the position and size of the document. The technique of this type is well known in usual facsimile machines which are designed to perform document reading while moving the sheet-like document, but it is hardly practiced because of various problems in machines of the type that the book-like document is placed on a document glass plate and an optical scan system or the document glass plate is scanned.

As to copying machines adapted to digitally process signals, there is known an apparatus that the entire process signals, there is known an apparatus that the entire surface of a pressure plate for pushing the document from the back side is formed into a reflection mirror, and the document is previously scanned once prior to reproduction processing so as to read the size and position of the document based on an image sensor output signal resulted from that scan. According to this apparatus, since the scan range to be read is automatically set, erroneous operation will not be caused. In this case, however, one reproduction processing requires twice scans, which results in a disadvantage of prolonging the processing time.

SUMMARY OF THE INVENTION

An object of the present invention is to automatically set a reading range, and to perform both detection of the reading range and image reading processing with one scan.

If it is so designed that an area where the document exists is read entirely, the document size can be decided just by judging the presence or absence of the document at respective scan positions. In other words, if it is so designed that the presence or absence of the document is detected in each part of the document reading surface in the main scanning direction and the sub-scanning direction, the document reading area can be properly decided based on simple judgement of a signal level. In such an apparatus, since an image reading section can be also used as an optical sensor, the image reading section is preferably utilized to detect the document size for simpler construction, in case of optically detecting the document size. Thus, an output signal from the image reading section may be monitored to judge the presence or absence of the document. To achieve this, it is envisaged to mount a reflection mirror over the pressure plate as mentioned above.

Figure 1:
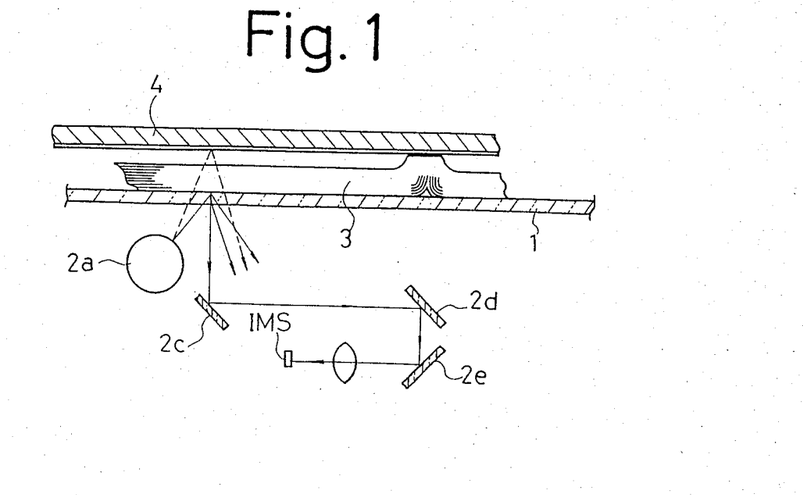
FIG. 1 is a front view showing one example of the construction of a conventional image reading apparatus.

In a reading apparatus of this type, as shown in FIG. 1, the light from an illumination lamp 2a is obliquely hit upon a document 3 and the reflected light traveling perpendicular to the document surface is guided to an image sensor IMS. Because the usual document surface scatters the light, the light can travel also in the direction perpendicular to the document even with the light being obliquely hit upon. In case of a mirror, however, since the light travels to meet such a rule that the reflection angle must be equal to the incident angle, the detection level resulted from scanning the mirror portion becomes a black level. Accordingly, in case a mirror is mounted over a pressure plate 4 to discriminate the document portion from the non-document portion, the presence or absence of the document must be judged using such a black level of the output signal from the image sensor. But, if the document includes some black portion, this portion also provides the same signal as issued when scanning the mirror portion, whereby complicated signal identity processing is required to discriminate the document area.

Therefore, by providing a second illumination lamp for detecting the document to the pressure plate itself, i.e., in a backside position of the document, it becomes possible to detect the presence or absence of the document based on simple level decision, because the light from the second illumination lamp is interrupted with the document in an area including the document, while the light from the second illumination lamp is received by a photoelectric converter for reading images in an area including no document, so that an output level (white level) of the photoelectric converter for reading images is largely varied depending on the presence or absence of the document.

Meanwhile, usual documents include at their end parts no information to be read. Accordingly, if reading is controlled with the foregoing method to continue until the document scan position comes out of the document, even an area at the document end part including no effective information is also subjected to reading, thus resulting in a fair waste.

Such a wasteful image reading can be prevented by providing a light receiving element for detecting the document position independently of the image sensor for reading images, and by arranging the light receiving element in a position shifted from the image sensor in the sub-scanning direction (or direction perpendicular to the solid scanning direction of the image sensor), thereby causing the light receiving element for detecting the document position to monitor the preceding sub-scan position always prior to the image sensor so that sub-scan is ended before the image reading area position has reached the document end.

DESCRIPTION OF PREFERRED EMBODIMENT

In the following, one preferred embodiment of the present invention will be described with reference to the accompanying drawings.

Figure 2A:
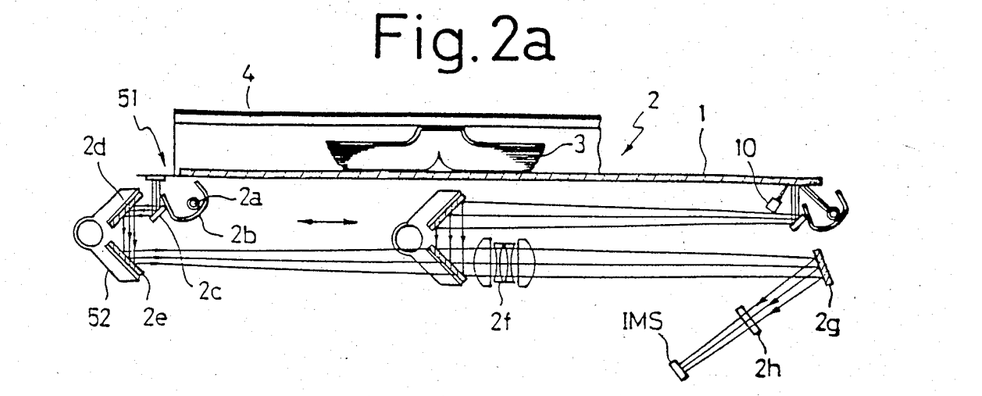
FIGS. 2a and 2b are a front view and a perspective view showing the construction of a scan mechanism according to one embodiment of the present invention, respectively.
Figure 2B:
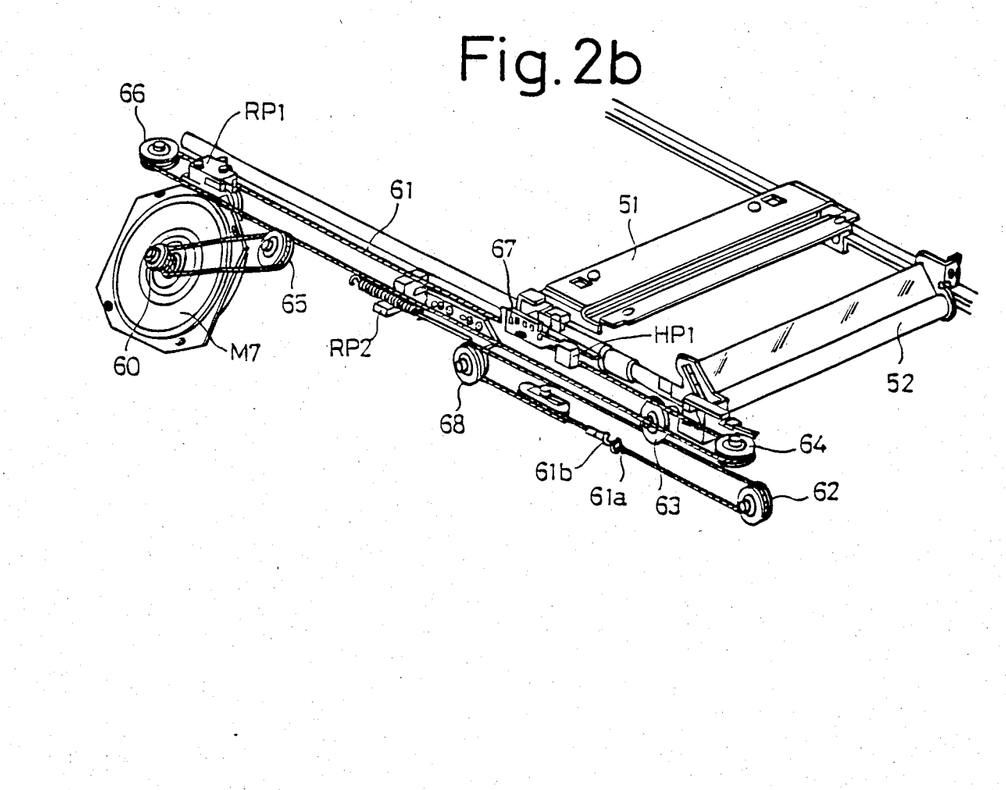

FIG. 2a shows the schematic construction of an image reading mechanism, and FIG. 2b shows a perspective view thereof.

Referring to FIG. 2a, designated at 1 is a contact glass on which a document 3 is placed. An optical scan system 2 is composed of a first carriage 51 comprising an illumination lamp (halogen lamp) 2a, a reflection plate 2b, a first mirror 2c, etc., a second carriage 52 comprising a second mirror 2d, a third mirror 2e, etc., a lens 2f, a fourth mirror 2g and so on. Designated at 2h is a dust-proof glass, at 4 is a pressure plate for pressing the document 3, and at IMS is a scanner sensor. The first carriage 51 and the second carriage 52 are both subjected to reciprocating scan drive (sub-scan) by means of a stepping motor M7 at the speed ratio of 2:1 while keeping an optical path from the document unchanged during scan.

Referring now to FIG. 2b, a drive wire 61 connected to the optical scan system is wound round a pulley 60 fixed to a shaft of the stepping motor M7. The drive wire 61 extends from its one end 61a to the other end 61b in the form of a closed loop after passing a stud pulley 62, a drive pulley 63 rigidly connected to the second carriage 52, a turn pulley 64, a bracket pulley 65, a pulley 60, a bracket pulley 65, a turn pulley 66, a bracket 67 rigidly connected to the first carriage 51, the drive pulley 63, and a tightener pulley 68.

In FIG. 2b, designated at HP1 is a switch (photo sensor) for detecting a home position of the scanner (optical scan system), at RP1 is a limit switch for detecting one going scan end position of the scanner, and at RP2 is a limit switch for detecting another going scan end position of the scanner.

Figure 3A:
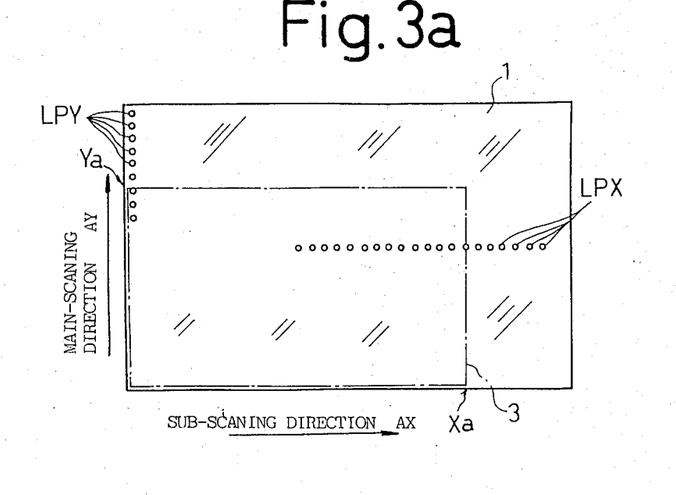
FIG. 3a is a rear view of an image reading apparatus when viewed from below a contact glass.

FIG. 3a shows the pressure plate 4 when viewed from below, i.e., from the side of the contact glass 1. In this example, the lower right corner of FIG. 3a corresponds to a reference position utilized when properly positioning the document 3. A light reflective member is attached to the surface of the pressure plate 4 (or the face abutting against the back side of the document). In particular, a number of lamps LPY each having its optical axis directed to the contact glass side are arranged into a line in the main scanning direction at the left end of the scan range, i.e., at the sub-scan starting position, while a number of lamps LPX each having its optical axis directed to the contact glass 1 side are arranged into a line in the sub-scanning direction at the central part in the main scanning direction (near the reference position).

Figure 3B:
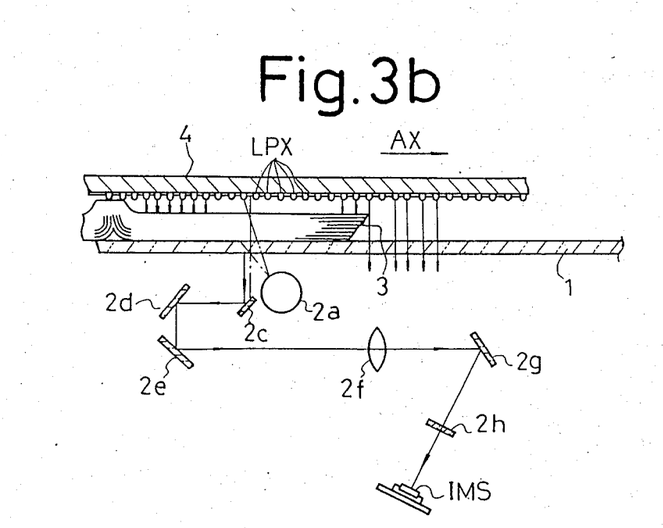
FIG. 3b is a front view schematically showing the scan mechanism and optical paths.

Referring now to FIG. 3b, the light emitted from the illumination lamp 2a is scattered by the surface of the document 3 in an area where it is present, and a part of the scattered light reaches a first mirror 2c positioned perpendicular to the surface of the document and then enters the scanner sensor IMS after passing the second mirror 2d, the third mirror 2e, the lens 2f, etc. As to an area where the document 3 is absent, the light emitted from the illumination lamp 2a will not reach the first mirror 2c.

On the other hand, the light emitted from the lamps LPX or LPY hits upon the back side of the document 3 and hence will not reach the first mirror 2c in an area where the document 3 is present, while the direct light from the lamps LPX or LPY gets through the contact glass 1 and then enters the scanner sensor IMS after passing the first mirror 2c, the second mirror 2d, the third mirror 2e, the lens 2f, etc. in an area where the document is absent. Accordingly, the light emitted from the lamps LPX and LPY is received by the scanner sensor IMS only in a state that the scan position is out of the document area, without affecting the image to be read. In this example, the direct light from the lamps LPX and LPY is set to have larger intensity than the reflected light resulted in case of normally scanning the document, so that the presence or absence of the document can be judged by monitoring an output signal level of the image sensor IMS.

Figure 2C:
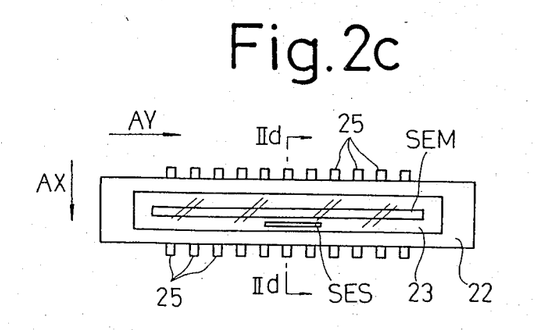
FIG. 2c is a plan view showing a scanner sensor IMS.
Figure 2D:
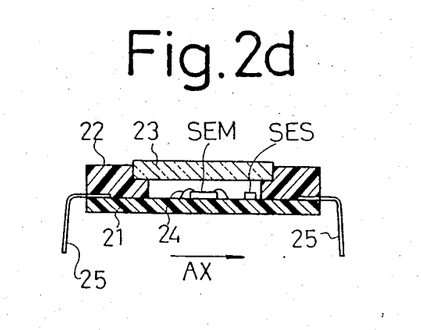
FIG. 2d is a sectional view taken along the line IId—IId in FIG. 2c.

FIGS. 2c and 2d show the scanner sensor IMS. Description will now be made by referring to FIGS. 2c and 2d. This sensor comprises a main sensor SEM for reading the document image and a sub-sensor SES for detecting the document position. More concretely, the main sensor SEM is formed of an one-dimensional CCD image sensor and the sub-sensor SES is formed of a phototransistor array comprising five phototransistors. The main sensor SEM and the sub-sensor SES are arranged to coincide with each other in their lengthwise directions, which correspond to the main scanning direction of the scanner (or the direction indicated by an arrow AY) when mounted on the apparatus. In other words, the main sensor SEM and the sub-sensor SES are arranged in positions slightly shifted from each other relative to the sub-scanning direction (or the direction indicated by an arrow AX). The sub-sensor SES is located at the central part of the main sensor SEM in the main scanning direction.

Stated differently, to the light receiving surface of the sub-sensor SES is guided through the optical system the light from the part locating ahead the image position currently under scan by the main image sensor SEM in the sub-scanning direction (or the direction indicated by an arrow AX), particularly from the central part in the main scanning direction. For example, therefore, when the sub-scan position reaches a point just before a rear end position Xa of the document 3, the light from the part ahead the rear end of the document 3 is received by the sub-sensor SES (see FIG. 3a). In an area ahead the rear end position Xa of the document 3, the light emitted from the lamps LPX will not be interrupted by the document 3 and hence enter the sub-sensor SES through the optical scan system. Thus, a little before the sub-scan position for reading the document image has reached the rear end of the document 3, the sub-sensor SES receives the light from the lamps LPX.

Semiconductor chips for the main sensor SEM and the sub-sensor SES are mounted within the same package (21, 22) with their light receiving surfaces being directed in the same direction. A piece of glass 23 is fitted on the light receiving surface side of the package. Lead pins 25 fixed to the package are connected to respective terminals of each semiconductor chip through bonding leads 24.

Figure 4:
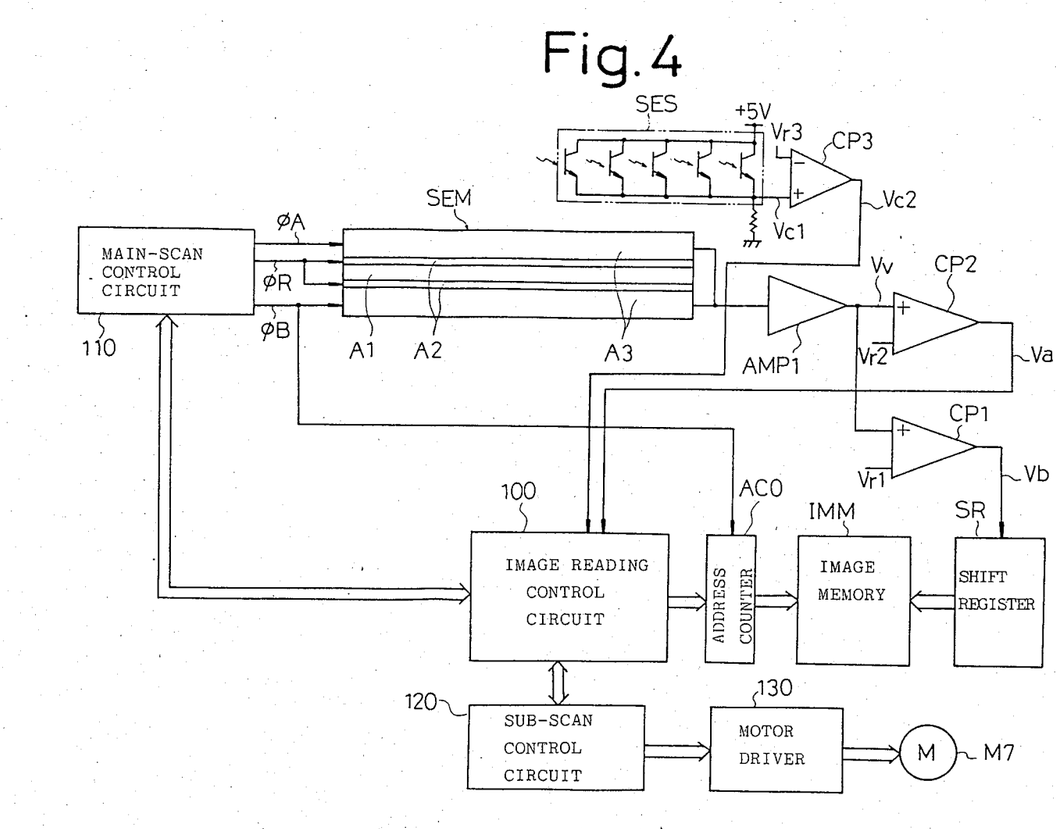
FIG. 4 is a block diagram showing the configuration of an electric circuitry incorporated in the embodied apparatus.

FIG. 4 shows the configuration of an electric circuitry according to this embodiment. Description will now be made by referring to FIG. 4. In this embodiment, the main sensor SEM is composed of a reading area A1 comprising a photodiode array, gate areas A2 and CCD shift registers A3. To the main sensor SEM are applied a reading control pulse signal $\phi R$ and two-phase shift pulse signals $\phi A$, $\phi B$ from a main scan control circuit 110.

An output signal of the main sensor SEM is amplified by an amplifier AMP1 and then applied to one input terminal of each of analog comparators CP1 and CP2. To the other input terminals of the analog comparators CP1 and CP2 are applied reference voltages Vr1 and Vr2 having different levels from each other, respectively. The reference voltage Vr1 is set to such a reference level as enabling to discriminate between a black level and a white level of the image, while the reference voltage Vr2 is set to such a reference level as enabling to discriminate between a level of the reflected light resulted in case of scanning an area where the document is present and a received light level of the direct light from the lamps LPY resulted in case of scanning an area where the document is absent (both levels being white levels).

A binary image signal Vb appearing at an output terminal of the analog comparator CP1 is converted into parallel data in the predetermined bit number through a shift register SR of serial-in/serial-out type and then applied to an image memory IMM.

On the other hand, five phototransistors constituting the sub-sensor SES are connected to one another at their collector terminals and DC voltage 5 V is applied to such a common line. Emitter terminals of those phototransistors are also connected to one another and this common line is grounded through a resistor. An output signal line (Vc1) of the sub-sensor SES is connected to one input terminal of an analog comparator CP3. To the other input terminal of the analog comparator CP3 is applied reference voltage Vr3. The reference voltage Vr3 is set to such a reference level as enabling to discriminate between a sub-sensor output level Vc1 resulted when the sub-sensor SES receives the direct light from the lamps LPX and a level Vc1 resulted when the sub-sensor SES receives no such direct light.

A sub-scan motor M7 is controlled with a sub-scan control circuit 120 through a motor driver 130. The main scan control circuit 110, the sub-scan control circuit 12, etc. are controlled with an image reading control circuit 100. The image reading control circuit 100 identifies the size and position of the document by referring the binary signals Va and Vc2 from the analog comparators CP2 and CP3.

Figure 5:
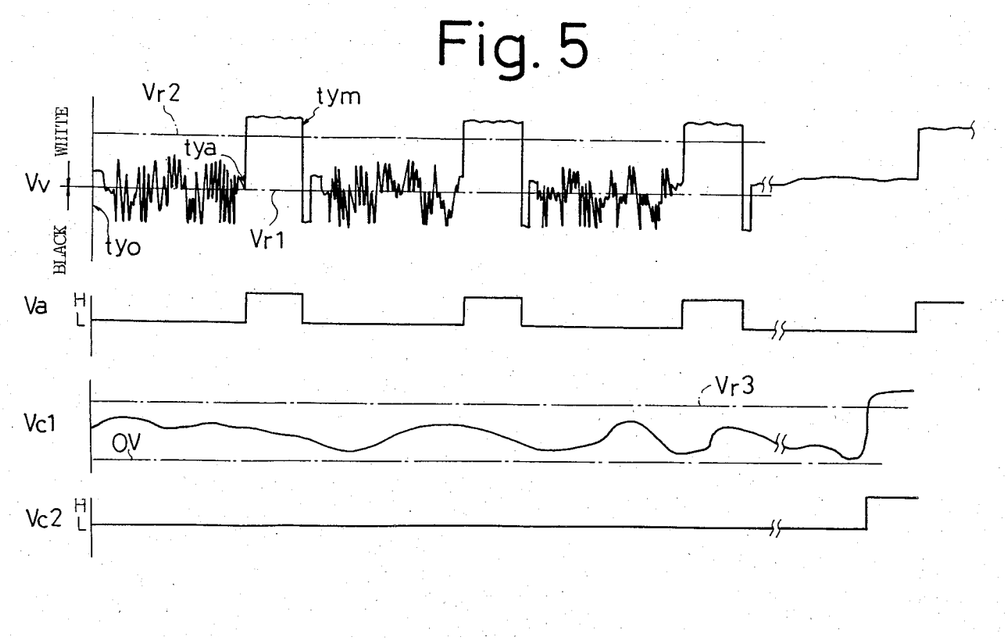
FIG. 5 is a timing chart showing the signal waveforms at various points in the circuit shown in FIG. 4 by way of example.

FIG. 5 shows examples of waveforms of an analog image signal Vv during scan, the binary signal Va from output terminal of the analog comparator CP2, the sub-sensor output signal Vc1, the binary signal Vc2 from output terminal of analog comparator CP3, and the reference voltages Vr1 and Vr2.

First, it is assumed that the apparatus is in a state immediately after starting to scan the document, namely, that the sub-scan position locates at the left end in FIG. 3a. If the document 3 is present between a start end Y0 and an intermediate point Ya of main scan, a level of the analog image signal Vv is varied up and down near the reference level Vr1 depending on the image, but it is always kept less than the reference level Vr2, because the light reflectance of paper is relatively low even though the light is reflected at maximum in an area including no image, during the period from a time ty0 to tya in which the area between Y0 and Ya is being read.

Exceeding the time tya, the scan position comes out of the document 3 so that the direct light from the lamps LPY mounted to the pressure plate 4 gets through the contact glass 1 and then enters the main sensor SEM through the optical scan system. The level of this direct light is higher than that of the reflected light from the document, whereby the level of the analog image signal Vv exceeds the reference level Vr2. Thus, the output level of the analog comparator CP2 is at a low level L during scan of the document area, while it is turned to a high level H when the scan position comes out of the document area. Main scan is ended at a time tym and subsequently the next line starts to be scanned.

Accordingly, the image reading control circuit 100 is able to decide a width Y of the document by checking an output level of the analog comparator CP2. In this example, for example, the width Y of the document image to be read can be decided based on both a time period from tya to ty0 in which the output level of CP2 is at L and a scan speed. The time period can be obtained by counting the main scan pulses $\phi A$ or $\phi B$, and the scan speed can be obtained from a pulse period of the main scan pulses.

Next, it is assumed that several lines near the position Xa in the sub-scanning direction are subjected to main scan. In this area which corresponds to an end portion of the document, the usual document includes no image to be read. Therefore, the intensity of light received by the main sensor SEM becomes a relatively high constant level (though somewhat fluctuated) which corresponds to that resulted from exposure of a white portion in the document. Looking now at the sub-sensor SES, because it receives the light coming from the part ahead the main sensor SEM by a predetermined amount (e.g., $\Delta$) in the sub-scanning direction, the position to be detected by the sensor SES comes into an area out of the document when the distance between the scan position of the main sensor SEM and the rear end of the document becomes smaller than $\Delta$. Thus, in the absence of document interrupting the light, the sub-sensor SES now receives the direct light from the lamp LPX so that the output level Vc1 of the sub-sensor SES is raised up higher than the reference level Vr3, whereby the output level Vc2 is turned to a high level H.

As a result, the image reading control circuit 100 is able to decide the area of the document 3 by monitoring the output levels of both the analog comparators CP2 and CP3 at appropriate timings.

In case of facsimile machines, for example, it is practicable that the level of the binary signal Va is first monitored while scanning several beginning lines to detect a position where the level is turned from L to H, thereby restricting the reading width (main scan area), and then the binary signal Vc2 is monitored to control reading of the transmitted image to be ended at the time when its level is turned from L to H, or after the lapse of a predetermined time from that time. This ending time may be set in accordance with the type of document used and the distance between those parts which are respectively detected by the main sensor SEM and the sub-sensor SES in the sub-scanning direction.

Although the one-dimentional sensor for reading images and the sensor for detecting the document position were arranged within a single sensor package in the foregoing embodiment, these sensors may be separately arranged in dependent cases so long as they can be located in a similar positional relationship. Also, in the above embodiment, the sensor for detecting the document position was composed of a plurality of light receiving elements to surely receive the direct light from light sources locating on the back side of the document, but a single light receiving element may be instead used by utilizing, for example, an optical lens which functions to focus the light in a widespread range onto the light receiving surface of that element. Furthermore, although the lamps LPX and LPY for detecting the document size was composed of a number of spot light sources in the illustrated embodiment, they can be replaced by hot cathod fluorescent tubes, low-speed thermionic vacuum florescent lamps, elongated tungsten bulbs, etc.

As fully described in the above, according to the present invention, since the presence or absence of the document can be simply decided while reading the image, there is no need of scanning two times, and since the optical system for reading images is commonly used for reading the document image and the detecting the document position, the construction is substantially simplified.

What is claimed is:

1. A character and picture information reading apparatus comprising:
    a document glass plate transparent in at least a part thereof;
    a first illumination lamp arranged in a position opposite to a document with said document glass plate therebetween;
    first light receiving means for reading an image of the document placed on said document glass plate;
    second light receiving means arranged near said first light receiving means with a light receiving surface thereof being directed substantially in the same direction as that of said first light receiving means;
    an optical system for guiding a light from the document to said first light receiving means and said second light receiving means;
    a scan mechanism for scanning at least either one of said document glass plate and said optical system;
    a second illumination lamp arranged on the back side of the document placed on said document glass plate with the optical axis thereof being directed toward said document glass plate, and having a length larger than a predetermined value at least in one direction of scan of the direction; and
    electronic control means for reading an output signal from said first light receiving means to read image information of the document, and deciding at least one of position and size of the document based on an output level from said second light receiving means and a position of said scan mechanism.

2. A character and picture information reading apparatus according to claim 1, wherein said first light receiving means is of a one-dimensional solid scan type image pickup device arrayed along an axis substantially perpendicular to the scanning direction of said scan mechanism, and wherein said second light receiving means is arranged in a position slightly shifted relative to the image pickup elements of said first light receiving means along an axis substantially perpendicular the direction of array of those image pickup elements.

3. A character and picture information reading apparatus according to claim 2, wherein said second light receiving means comprises a plurality of light receiving elements arrayed substantially in the same direction as the image pickup elements of said first light receiving means.

4. A character and picture information reading apparatus according to claim 1, wherein said second illumination lamp comprises a plurality of spot light sources arranged in the predetermined direction.

5. A character and picture information reading apparatus according to claim 1, wherein said second illumination lamp comprises a first set of light sources having a predetermined length in the scanning direction of said scan mechanism, and a second set of light sources having a predetermined length in the direction substantially perpendicular to the lengthwise direction of said first set of light sources.

6. A character and picture information reading apparatus comprising:
    a document glass plate transparent in at least a part thereof;
    a first illumination lamp arranged in a position opposite to a document with said document glass plate therebetween;
    a one-dimensional solid scan type image pickup device arranged in the direction of an axis substantially perpendicular to a mechanical scanning direction of the document for reading the document placed on said document glass plate;
    optical detection means arranged near said one-dimensional solid scan type image pickup device in a position capable of receiving a light from the image locating ahead the image currently detected by said image pickup device in the scanning direction, with a light receiving surface thereof being directed substantially in the same direction as that of said image pickup device;
    an optical system for guiding a light from the document to both said one-dimensional solid scan type image pickup device and said optical detection means;
    a scan mechanism for mechanically scanning at least either one of said document glass plate and said optical system;
    a second illumination lamp arranged on the back side of the document placed on said document glass plate with the optical axis thereof being directed toward said document glass plate, and having a predetermined length in each of the scanning direction of said scan mechanism and the direction substantially perpendicular to this scanning direction; and
    electronic control means for reading an output signal from said one-dimensional solid scan type image pickup device to thereby read image information of the document, and for deciding at least one of position and size of the document based on an output level from said optical detection means and a position of said scan mechanism.

7. A character and picture information reading apparatus according to claim 6, wherein said optical detection means comprises a plurality of light receiving elements arrayed substantially in the same direction as array of image pickup elements of said one-dimensional solid scan type image pickup device.

8. A character and picture information reading apparatus according to claim 6, wherein said second illumination lamp comprises a plurality of spot light sources arrayed in the predetermined direction.

* * * * *